(12) United States Patent
Long et al.

(10) Patent No.: US 10,608,505 B1
(45) Date of Patent: Mar. 31, 2020

(54) COOLING MOTOR CONTROLLER WITH A MOTOR WITH DUCT

(71) Applicant: Wisk Aero LLC, Mountain View, CA (US)

(72) Inventors: Geoffrey Alan Long, Montara, CA (US); Justin Char, San Jose, CA (US); Nathan Elliot Frank, Santa Clara, CA (US); Robert Wayne Moore, Fremont, CA (US); Diederik Marius, Mountain View, CA (US); Michael John Burgart, Los Altos, CA (US)

(73) Assignee: WISK AERO LLC, Mountain View, CA (US)

( * ) Notice: Subject to any disclaimer, the term of this patent is extended or adjusted under 35 U.S.C. 154(b) by 0 days.

(21) Appl. No.: 15/893,401

(22) Filed: Feb. 9, 2018

(51) Int. Cl.
| | | |
|---|---|---|
| *H02K 9/06* | (2006.01) | |
| *H02K 5/18* | (2006.01) | |
| *H02K 7/14* | (2006.01) | |
| *B64D 35/02* | (2006.01) | |
| *H02K 16/02* | (2006.01) | |
| *H02K 15/14* | (2006.01) | |
| *H02K 11/30* | (2016.01) | |

(52) U.S. Cl.
CPC .............. *H02K 9/06* (2013.01); *B64D 35/02* (2013.01); *H02K 5/18* (2013.01); *H02K 7/14* (2013.01); *H02K 11/30* (2016.01); *H02K 15/14* (2013.01); *H02K 16/02* (2013.01)

(58) Field of Classification Search
CPC .. H02K 9/02; H02K 9/04; H02K 9/06; H02K 11/30; H02K 11/33; H02K 5/18; H02K 5/20; H02K 5/24; H02K 7/14; H02K 15/14; H02K 16/02; B64D 35/02

USPC .......... 310/63, 60 R, 58, 64, 62, 53, 55, 71, 310/68 R
See application file for complete search history.

(56) References Cited

U.S. PATENT DOCUMENTS

| | | | | |
|---|---|---|---|---|
| 8,456,049 | B2* | 6/2013 | Matsuda | B62D 5/0406 180/444 |
| 8,584,595 | B2* | 11/2013 | Koyama | F04D 25/105 105/133 |
| 8,866,353 | B2* | 10/2014 | Miyama | H02K 11/33 310/58 |
| 9,318,932 | B2* | 4/2016 | Purohit | H02K 9/06 |
| 9,467,030 | B2* | 10/2016 | Camilleri | H02K 15/14 |

(Continued)

*Primary Examiner* — Jermele M Hollington
*Assistant Examiner* — Maged M Almawri
(74) *Attorney, Agent, or Firm* — Kilpatrick Townsend & Stockton LLP

(57) ABSTRACT

Embodiments of cooling a motor controlling using a motor are disclosed. In some embodiments, a system includes an electric motor including at least one rotor with integrated features positioned and configured to pull air into and through the electric motor. The system also includes at least one motor controller each comprising a heat sink positioned in an air intake path from a source of air to the electric motor. A method of manufacturing the system includes arranging at least one motor controller and at least one electric motor, coupling the at least one motor controller and at least one electric motor via a flexible duct, and adapting the arrangement of the at least one motor controller and the at least one electric motor to passively provide cooling via airflow through the at least one motor controller and at least one electric motor in proportion to a load on the at least one electric motor.

20 Claims, 8 Drawing Sheets

(56) References Cited

U.S. PATENT DOCUMENTS

| | | | | |
|---|---|---|---|---|
| 9,812,920 B2* | 11/2017 | McKinzie | ............... | H02K 5/20 |
| 2006/0125240 A1* | 6/2006 | Kato | .................. | F02N 11/04 |
| | | | | 290/31 |
| 2008/0106159 A1* | 5/2008 | Yoshida | ................... | H02K 9/22 |
| | | | | 310/50 |
| 2009/0184599 A1* | 7/2009 | Kanazawa | ............. | H02K 1/148 |
| | | | | 310/195 |
| 2010/0270419 A1* | 10/2010 | Yoeli | .................. | B64C 29/0025 |
| | | | | 244/12.1 |
| 2012/0019084 A1* | 1/2012 | Tsuge | ....................... | H02K 5/20 |
| | | | | 310/59 |
| 2014/0225473 A1* | 8/2014 | Uchiyama | .............. | G04C 10/00 |
| | | | | 310/306 |
| 2015/0145255 A1* | 5/2015 | Borisenko | ............... | B60L 11/02 |
| | | | | 290/45 |
| 2016/0079824 A1* | 3/2016 | McKinzie | ............... | H02K 5/20 |
| | | | | 310/63 |
| 2017/0317557 A1* | 11/2017 | Inamura | ................ | H02K 11/33 |
| 2018/0034346 A1* | 2/2018 | Purohit | .................. | H02K 21/12 |
| 2018/0115214 A1* | 4/2018 | Akiyoshi | ................ | H02K 5/04 |

* cited by examiner

700

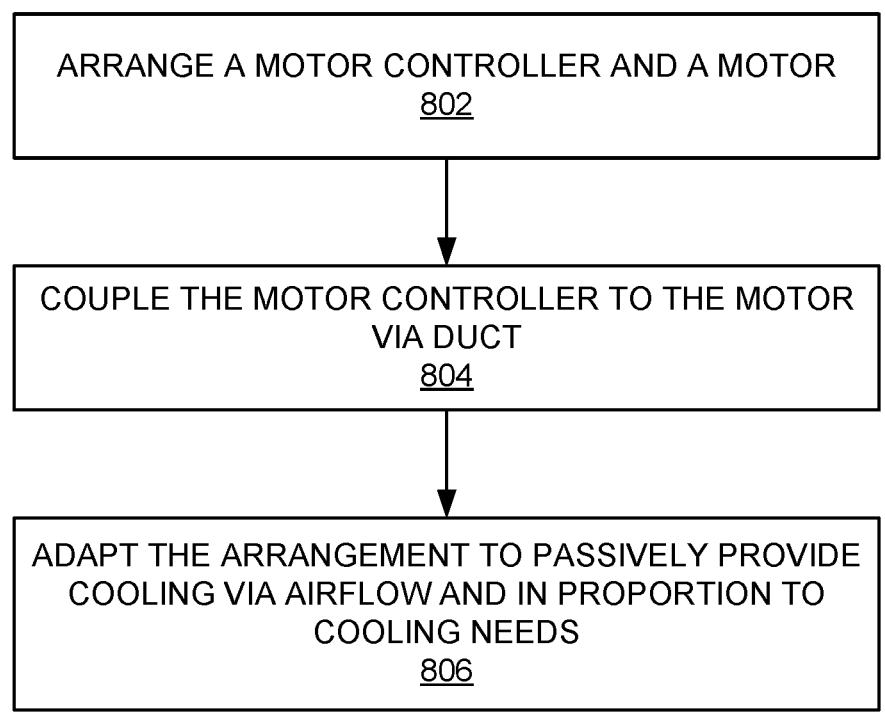

COOLING MOTOR CONTROLLER WITH A MOTOR WITH DUCT

BACKGROUND OF THE INVENTION

An electric motor converts electrical energy to mechanical energy to meet a work or load requirement of a device in which the motor is provided. Sometimes, a motor controller instructs the electric motor to operate by energizing the windings of the electric motor. Motors and motor controllers give off heat due to various inefficiencies such as operation of PCBs on the controller and winding resistance in the motor. The heat that is generated needs to be dissipated to prevent motor and controller malfunction.

BRIEF DESCRIPTION OF THE DRAWINGS

Various embodiments of the invention are disclosed in the following detailed description and the accompanying drawings.

FIG. 8 is a flow chart illustrating an embodiment of a process for manufacturing a motor controller and motor.

DETAILED DESCRIPTION

Figure 1:
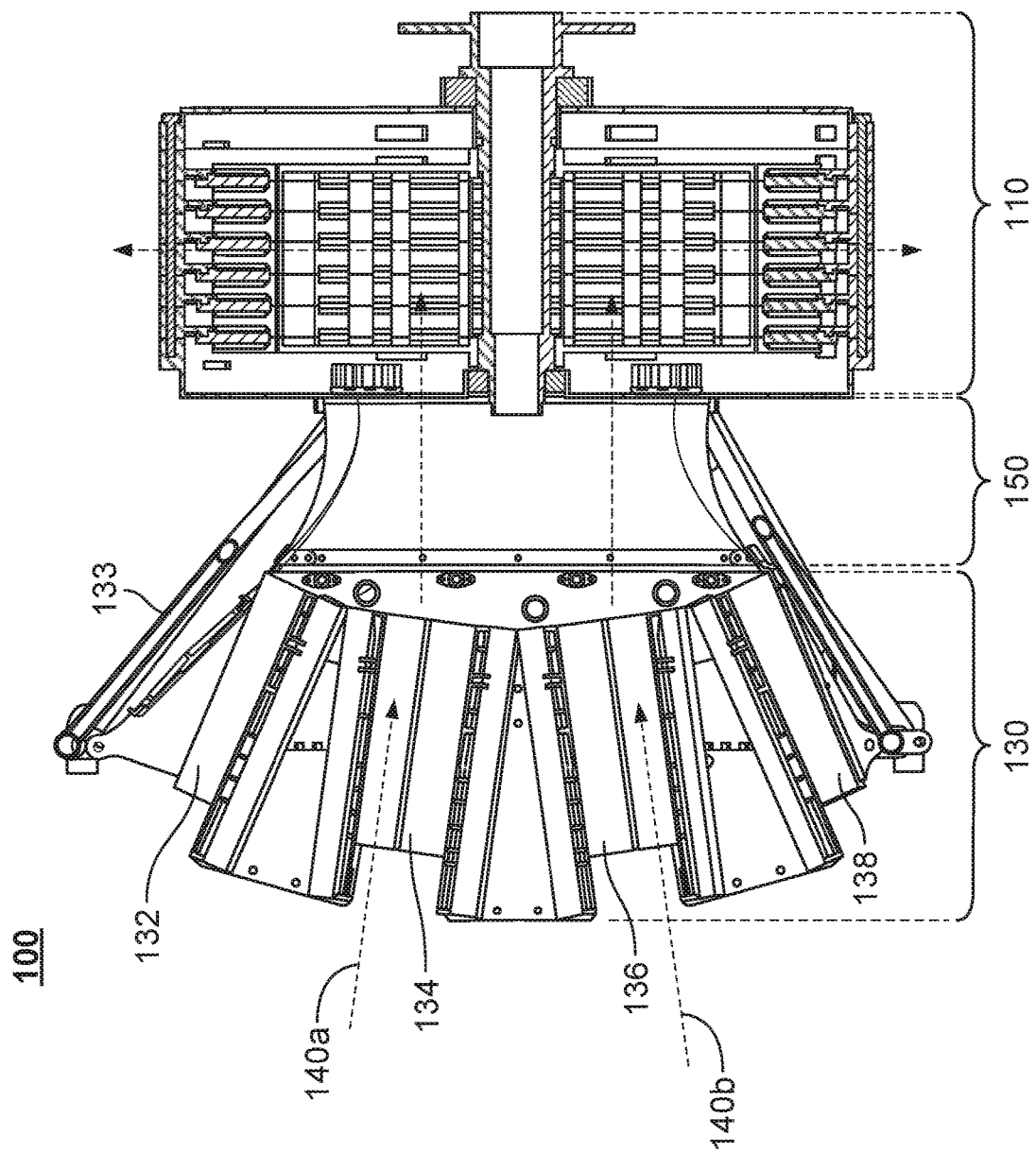
FIG. 1 is a side cross-sectional view of an embodiment of system for cooling a motor controller using a motor.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Motors and motor controllers give off heat when they are in operation. For example, sources of heat in electric motors include winding resistance, friction, and eddy currents. As loads increase, the electric motor may heat more quickly. Sources of heat in controllers include electrical components on a printed circuit board (PCB) that tend to heat when conducting a current due to undesired electric resistance (also known as Joule heating).

Heat can be damaging to motor and controller materials such as PCB materials and insulators on the winding wiring. The components in the motor and controller have a heat tolerance depending on the materials used and prolonged exposure to heat causes the materials to degrade and malfunction prematurely. Heat can also impact the efficiency of an electric motor by increasing winding resistance losses and weakening magnetic field. This means that motors with better heat dissipation have better load capabilities. Thus, effective heat dissipation facilitates motor operation and increases motor longevity.

Conventionally, a motor can be cooled by adding fan features to the motor. When the motor spins, the fan features suck and/or blow air over or through the motor to cool the motor. A motor controller can be cooled by conductive cooling, forced air cooling, or liquid cooling. Conductive cooling is typically implemented by providing structures to transfer motor heat through a mounting interface to the environment. Forced air cooling is typically implemented by providing an electrical fan in proximity to the motor to suck in air and expel air away from the motor controller. Liquid cooling is typically implemented by circulating a cooling agent around the motor. Each of these techniques typically add weight and complexity to the motor. This in turn decreases the reliability of the motor and adds expense to the manufacture and maintenance of the motor.

Embodiments of cooling a motor controller using the motor that the controller drives are described. In various embodiments, elements of the motor provide cooling for both the motor and the motor controller without needing additional parts. In some embodiments, a system includes an electric motor including at least one rotor with integrated features positioned and configured to pull air into and through the electric motor. The system also includes at least one motor controller each comprising a heat sink positioned in an air intake path from a source of air to the electric motor.

FIG. 1 is a side cross-sectional view of an embodiment of system for cooling a motor controller using a motor. The system 100 includes motor 110, motor controller 130, and duct 150. The system finds application in a variety of devices, vehicles, and aircraft including a forward propulsion system. For example, the motor 110 may be a pusher motor for forward flight as more fully explained herein with respect to FIG. 7.

In various embodiments, the motor 110 is an electric motor comprising one or more magnetic units. The magnetic units may be adapted to generate torque when the unit's magnetic field interacts with its winding currents. For example, in various embodiments a magnetic unit includes a stator and one or more rotors. The stator includes windings that can be driven by an alternating current to create a magnetic field. The rotor includes a magnetic array that interacts with the magnetic field to rotate. The rotation of the rotor produces a torque about the rotor's axis, which torque can be transferred, for example via a shaft coupled to the rotor, to drive a device in which the motor is provided.

The motor 110 may include one or more active components that generate heat when the motor is operation. For example, heat may be generated due to the resistance in the windings of magnetic units of the motor. Sometimes, when a propeller spins more rapidly, this increases the load on the motor and generates more heat in the motor. The motor may be cooled according to the techniques further described herein.

The motor 110 may include one or more fan features. In some embodiments, the fan features are provided on a rotor of the motor. For example, each rotor may have a piece or portion of the fan feature such as a fin, paddle, spoke, blade, vane, or the like. When assembled, the pieces form fan features in the motor that facilitate air flow through the motor. The fan features may facilitate radial air flow (represented by the segments of arrows 140a and 140b pointing from the center of the motor near the shaft outwards) when the rotor spins, e.g., behaving like a centrifugal fan. The centrifugal fan features may be adapted to draw air through both the motor and the motor controller, e.g., via example paths 140a and 140b as more fully explained herein. An example of a motor is shown in FIG. 5.

The motor controller 130 is adapted to drive the motor by energizing the windings of in the motor. In various embodiments, the motor controller (sometimes simply called "controller") converts DC power from a battery to AC at a pre-determined frequency to drive the windings in the motor. Depending on various flight modes such as take-off vs. forward flight, the AC frequency can be varied to generate a desired amount of power in the motor.

In various embodiments, the motor controller includes one or more PCBs with electronics configured to execute instructions to control the motor. In the example of FIG. 1, there are six controller boards. The PCBs may each be programmed with instructions such as the frequencies by which to pass AC to the motor to energize the motor windings. In various embodiments, the number of PCBs provided in the controller is proportional to the number of magnetic units in the motor being driven by the controller.

Figure 6:
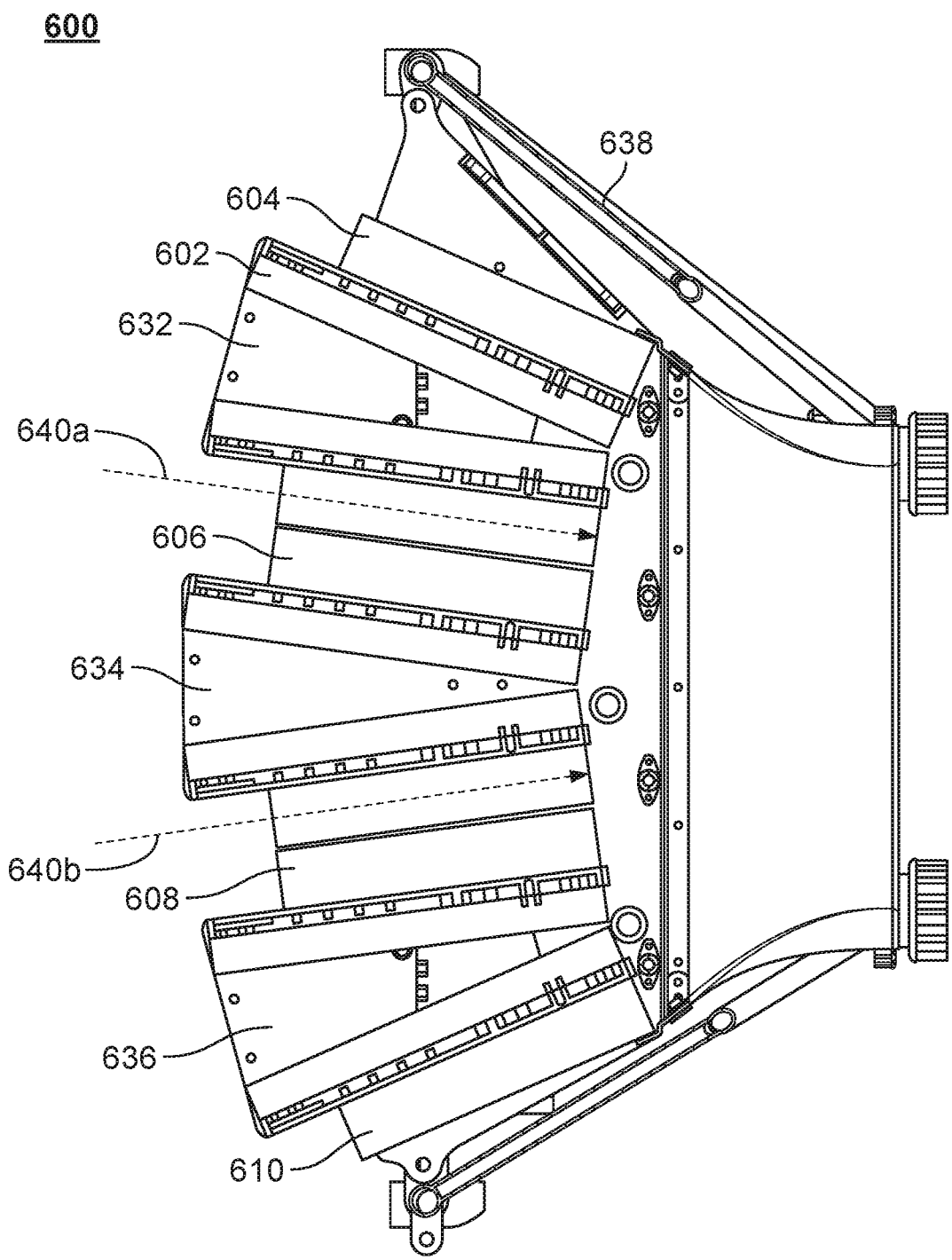
FIG. 6 illustrates an embodiment of a motor controller.

Typically, when the PCB is powered and in operation, heat is generated due to, among other things, electrical resistance. The motor controller 130 may include one or more heat sinks (here, heat sinks 132, 134, 136, and 138). The heat sinks may be adapted to reject heat in proportion to the controller's and/or motor's cooling needs as more fully explained herein with respect to FIG. 6. An example of a motor controller is shown in FIG. 6.

The motor 110 and motor controller 130 may be coupled by a duct 150. In various embodiments, duct 150 is a flexible duct that allows motor 110 and controller 130 to move independently of each other while being connected. The motor can be soft mounted (e.g., by rubber) so that the shaking of the motor (e.g., caused by its load such as a propeller) does not also shake the controller, which may have fragile components such as electronics. As shown in FIG. 1, the duct forms a passage through which air passes from controller 130 to motor 110, via paths 140a and 140b. The duct may be made of a flexible material such as rubber. The type of material selected may be adapted to the desired flexibility of the coupling between the motor and the controller.

In some embodiments, the coupling of the motor 110 and motor controller 130 may be reinforced by one or more structural components such as 133, which is a mounting structure common to the motor and controller. The mounting structure may be implemented by a welded steel frame. This mounting structure is merely an example, and other coupling/mounting structures are possible.

In operation, cooling is provided for a controller using a motor without needing additional cooling components. System 100 promotes both axial air flow and radial air flow (arrows 140a and 140b) through the motor 110. The fan features of the motor 110 causes air to be sucked through the controller 130 to cool both the controller and the motor. The motor 110 slings air outwards radially (arrows 140a and 140b) in the course of its rotation using integrated fan features, cooling the motor's active components. Makeup air is drawn in axially (arrows 140a and 140b) through duct 150. As shown, one end of the duct is coupled to motor 110 and the other end of the duct is coupled to motor controller 130. The end coupled to the motor controller 130 may pull air through the controller's heat sinks before the air enters the duct. In various embodiments, when the motor is operating (e.g., causing heat to be dissipated in the controller), the controller receives cooling airflow in rough proportion (e.g., in monotonic relation) to the heat being dissipated in the controller without requiring active cooling control or additional components.

In various embodiments, in still air (e.g., when a vehicle is stationary or aircraft is on the ground), sufficient air flow is provided through the motor and motor controller. For example, for a fixed-pitch propeller, the load and cooling are both functions of the motor's propeller rotational speed. If a propeller is the load, as the motor spins the propeller faster, more torque is required and thus more heat is generated in the controller, increasing its cooling needs. As the motor spins faster to power the propeller, the fan features of the motor drive additional cooling airflow. Cooling is increased because when the propeller spins more rapidly, the motor also spins more and causes more air to be drawn in through the controller. Conversely, if the motor spins the propeller more slowly, less torque is required and less heat generated. The slower speed of the motor also turns the fan features more slowly, resulting in less cooling airflow. Thus, cooling is provided in monotonic relation to cooling needs.

In various embodiments, the motor and controller system is cooled on a single side such that air exits radially, and is not pulled from right of the dashed line shown in FIG. 1 to the left of FIG. 1.

Figure 2:
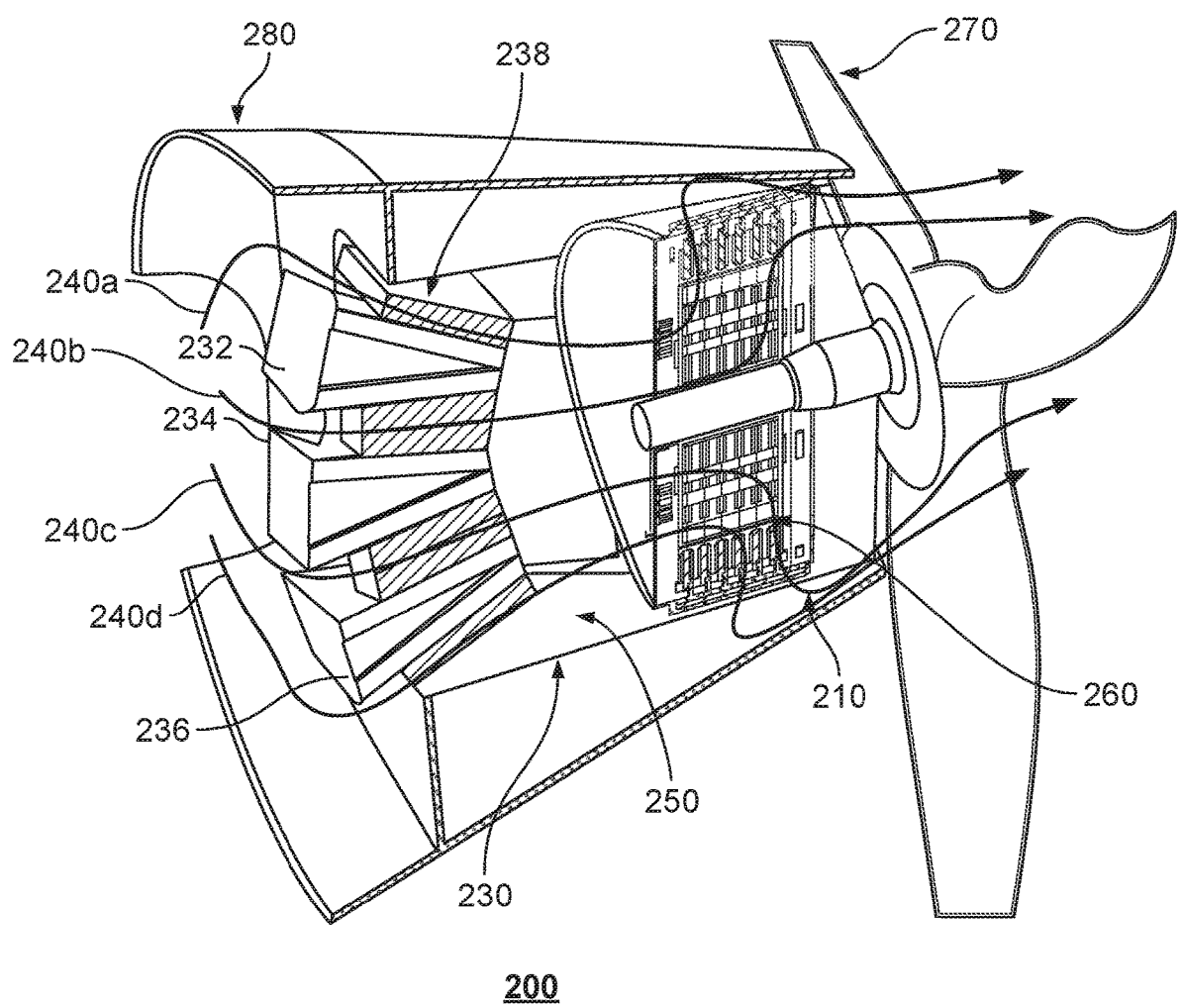
FIG. 2 is a perspective cross-sectional view of an embodiment of a system for cooling a motor controller using a motor, provided in a propulsion system.
Figure 7:
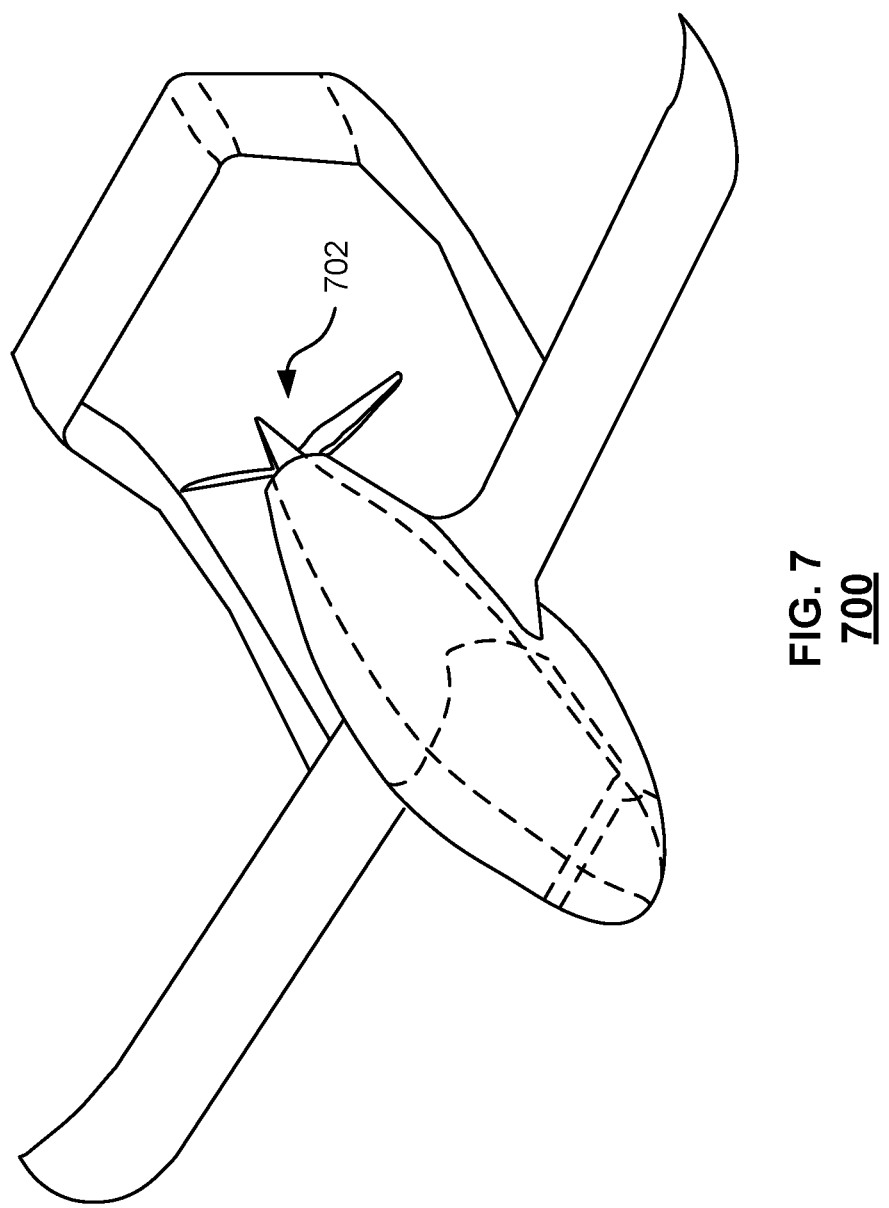
FIG. 7 is a block diagram illustrating an example of an aircraft in which a motor capable of cooling a controller is provided.

FIG. 2 is a perspective cross-sectional view of an embodiment of a system for cooling a motor controller using a motor, provided in a propulsion system. The system 200 includes motor 210, motor controller 230, and duct 250. Duct 250 may be adapted to flexibly couple the motor 210 to the motor controller 250. The motor 210 is adapted to drive propeller 270. The motor and controller are housed in a fairing 280. The fairing may have one or more inlets such as a low-drag air inlet (e.g., a NACA duct) to facilitate air flow as more fully described herein. Each of the components function like their counterparts in FIG. 1 unless otherwise described herein. An example of an aircraft in which the propulsion system 200 is provided is shown in FIG. 7.

In operation, air moves through controller heat sinks 232, 234, and 236. For example, the air enters through one or more air inlets (e.g., NACA ducts) on the fairing 280, moves through the controller heat sink and over PCB (e.g., 238) via pathways 240a-240d. Air is pulled over stators 260 of the magnetic units in motor 210 to cool heat generated by the magnetic units. As shown, air exits radially from the motor 210, then leaves the propulsion system via exhaust pathway around the propeller 270. When propeller 270 is in motion, suction from the propeller 270 sucks out the exhaust air out of the motor and away from the propellers.

Figure 3:
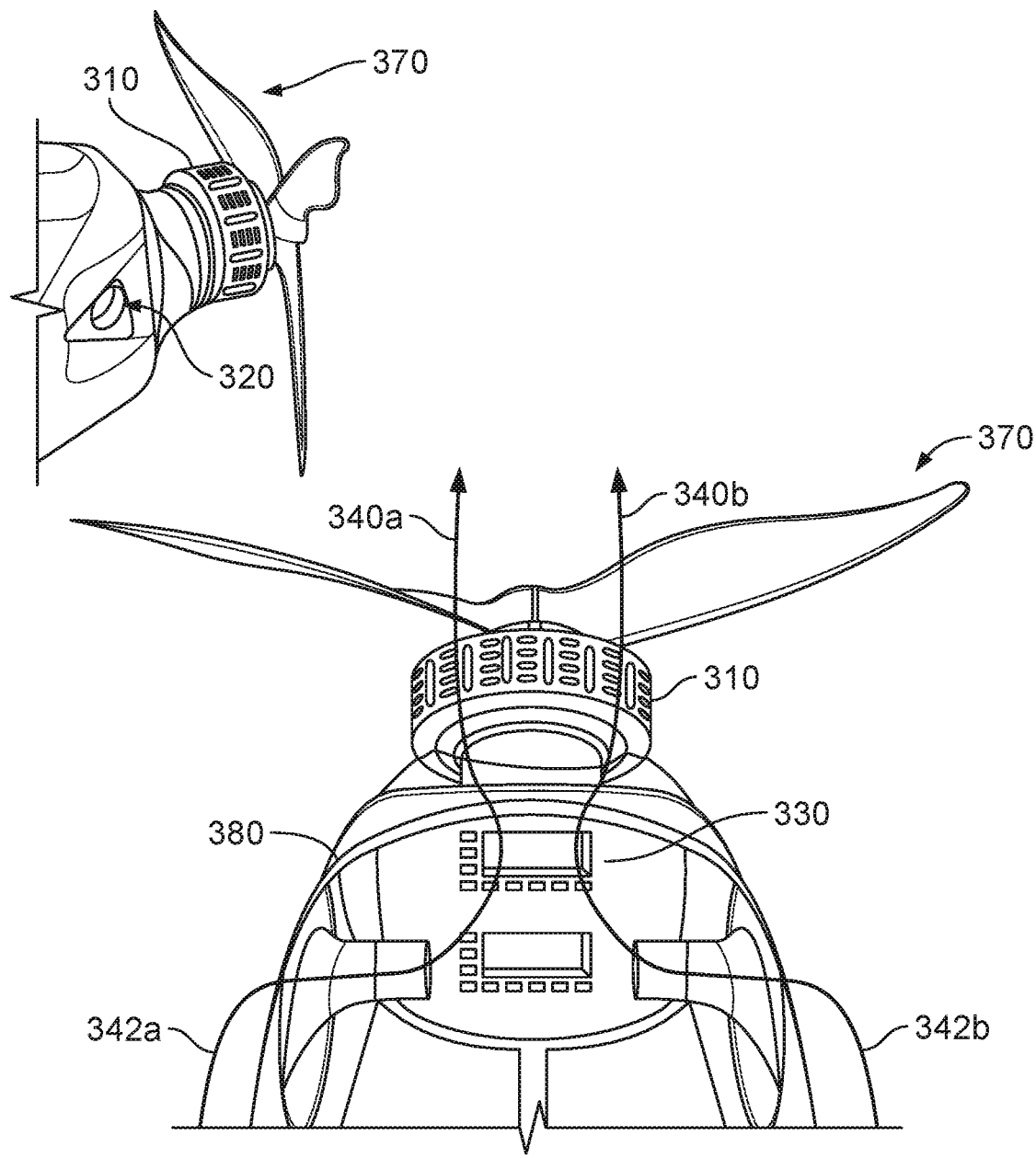
FIG. 3 is a perspective view of an embodiment of a system for cooling a motor controller using a motor, provided in a propulsion system.

FIG. 3 is a perspective view of an embodiment of a system for cooling a motor controller using a motor, provided in a propulsion system. The propulsion system 300 includes propeller 370, motor 310, and motor controller 330. The propeller 370 may include one or more blades (here, three blades). Each of the components function like their counterparts in FIG. 2 unless otherwise described herein. A portion of an aircraft cabin 380 is also shown in FIG. 3

The aircraft may include a plurality of sources for air intake. For example, air enters through inlets on a fairing 320. As another example, air enters from outside the cabin 380 via pathways 342a, 342b. The air taken into the aircraft flows via example pathways 340a and 340b to exit the aircraft. When the propeller spins, suction is created to suck exhaust air out of the propulsion system.

Figure 4A:
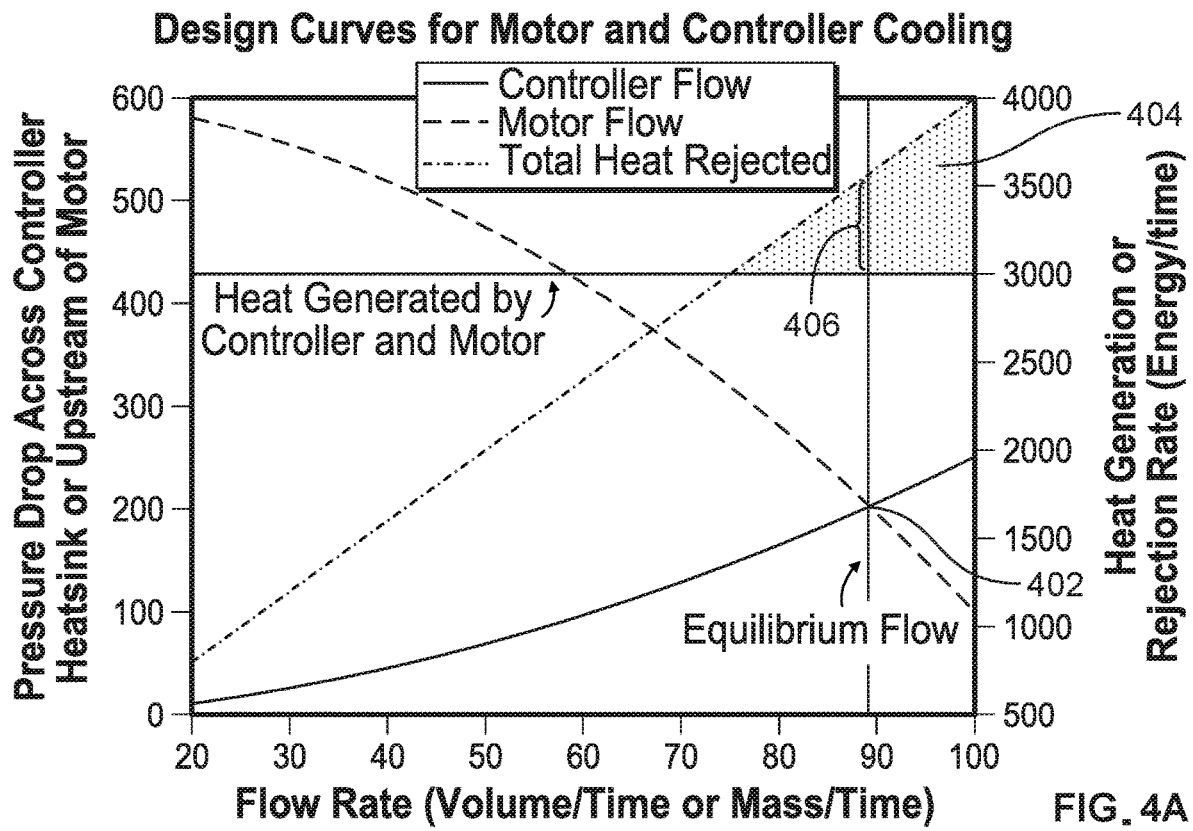
FIG. 4A illustrates an example of a design curves for motor and controller cooling obtained in some embodiments.

FIG. 4A illustrates an example of a design curves for motor and controller cooling obtained in some embodiments. In this example, the curves are shown at a specific operating point (at a given torque, RPM, and maximum operating temperature). The graph shows three curves: a first curve representing the controller flow, a second (dashed) curve representing the motor flow, and a third (dot-dashed) curve representing the total heat rejected at the specific operating point (e.g., at a maximum operating temperature). The motor flow curve is also called a fan curve or cooling curve. The motor flow curve describes a relation between flow and pressure of air flowing through a device. A motor flow curve describes a physical characteristic of a fan or device such as a motor (e.g., as the motor spins). The controller flow curve describes a relationship between the pressure drop across a restriction, such as the heat sink of a motor controller, to the flow through the restriction. As shown in this example, the flow rate driven by the fan is in rough inverse proportion to the static pressure across the fan restriction, and the flow rate across the restriction is in rough proportion to the static pressure across the restriction.

In this example, the heat generated by the controller and motor is 3000 units, the equilibrium flow is a little less than 90 units. An equilibrium flow condition can be determined from the intersection 402 of the motor fan curve and the controller heat sink pressure vs. flow curve. A region of acceptable thermal performance can be determined from shaded region 404. In this region, the total heat that could be rejected is greater than the heat generated by the controller and motor. In various embodiments, implementing the processes described here causes equilibrium flow to be in the range 406. Operation in range 406 ensures that the equilibrium flow condition line intersects the region of acceptable thermal performance 404, meaning that the equilibrium flow rate would provide cooling equal to or greater than the heat generation of the controller and motor at the operating condition.

Figure 4B:
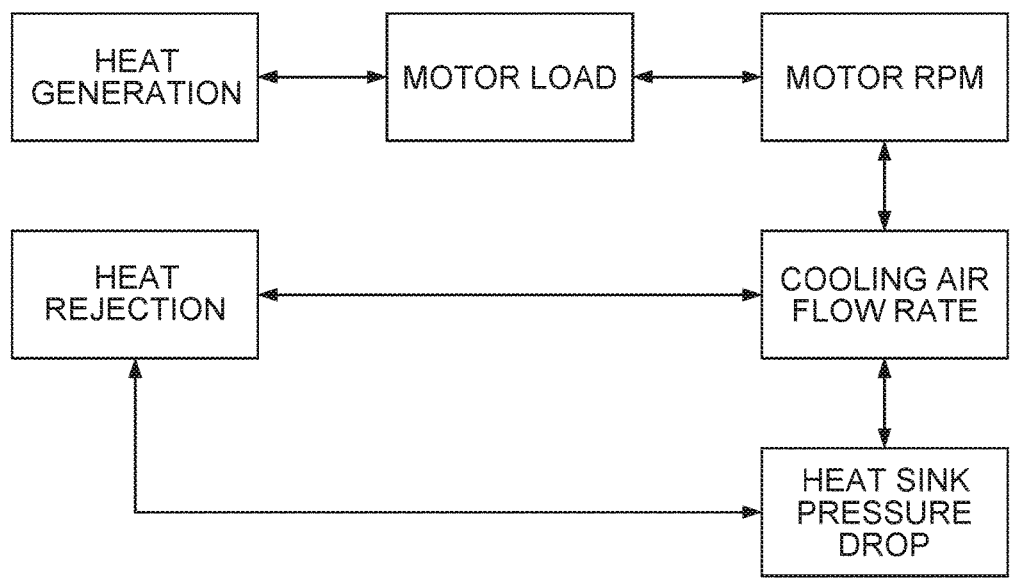
FIG. 4B illustrates a process to balance flow-driving capability of the motor with the restriction of a controller's heat sink.

FIG. 4B illustrates a process to balance flow-driving capability of the motor with the restriction of a controller's heat sink. The example process shown in FIG. 4B is an iterative process that ensures that heat rejection is no less than the heat generation at the desired operating condition. In various embodiments, at a worst-case operating condition (e.g., minimum flow rate and maximum cooling demand) the balancing of the flow-driving capability of the motor with the restriction of a controller's heat sink provides adequate cooling to both the motor and controller. In various embodiments, the load on the motor and controller, and consequently the heat generated, may increase as the rotational speed of the motor increases. As the rotational speed of the motor increases, additional cooling flow is provided by the fan features of the motor. Thus, in some embodiments, the controller receives cooling airflow in rough proportion (e.g., in monotonic relation) to the heat being dissipated in the controller without requiring active cooling control or additional components.

In various embodiments, the motor 110 of FIG. 1 may be implemented by a motor having stacked magnetic units. For example, the motor may be a modular motor having identical magnetic units. In various embodiments, the motor may be an axial-flux motor (which may be in-runner) in which the inside of the motor runs as more fully explained with respect to FIG. 5. The techniques described here may also be applied to out-runner axial-flux motors, radial-flux motors, and other types of motors.

Figure 5A:
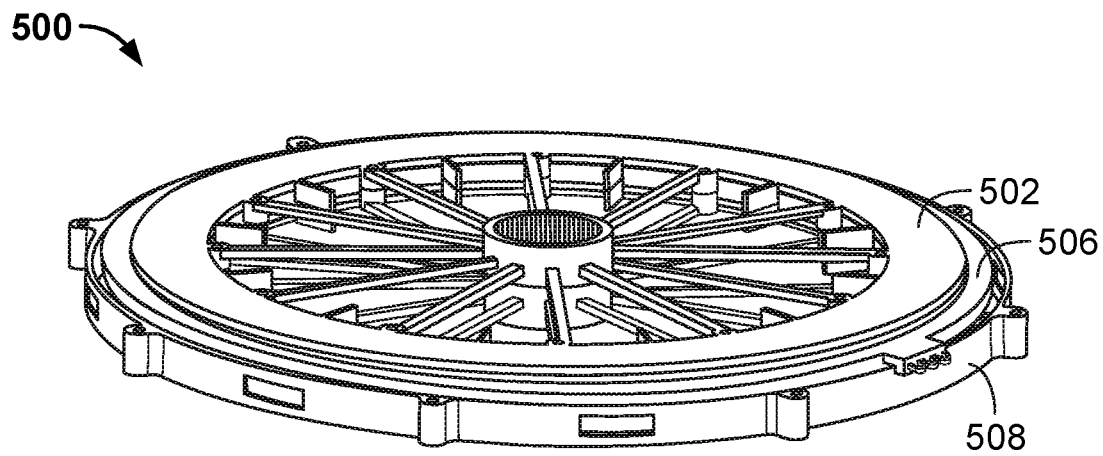
FIG. 5A is a cross-sectional view of an embodiment of a magnetic unit for a motor.

FIG. 5A is a cross-sectional view of an embodiment of a magnetic unit for a modular motor assembly. The magnetic unit 500 includes rotor housing 502, stator 506, rotor (not shown), and stator housing 508. The rotors may be implemented by a magnetic array such as a Halbach array. Adjacent magnetic arrays may be attached to a same physical piece but need not interact magnetically. For example, the magnetic arrays may be magnetically aligned. This allows, in various embodiments, the magnetic units to be removed from the motor and the remaining magnetic units would be compatible with one another. The example upper rotor housing is shown with an output shaft on top.

The stator 506 may include wire winding mounted to the stator housing. For example, the stator may include a wire winding encased in fiberglass. In some embodiments, the stator housing may be different from the one shown in FIG. 5A. The stator may have pockets machined into it to accommodate pins of a structural segment such as pin 404 of FIG. 4. The stator may be removably coupled to the structural segment. For example, the pockets of the stator allow the stator to sit (sometimes referred to as "float") on the pins of the structural segment. The coupling of the stator to the structural segment allows torque to be transferred to the canister formed by the structural segments. The floating stator transfers torque without needing to be fixedly coupled to adjacent components. A plurality of bearings may control motion between the upper rotor and the stator and the lower rotor and the stator.

Figure 5B:
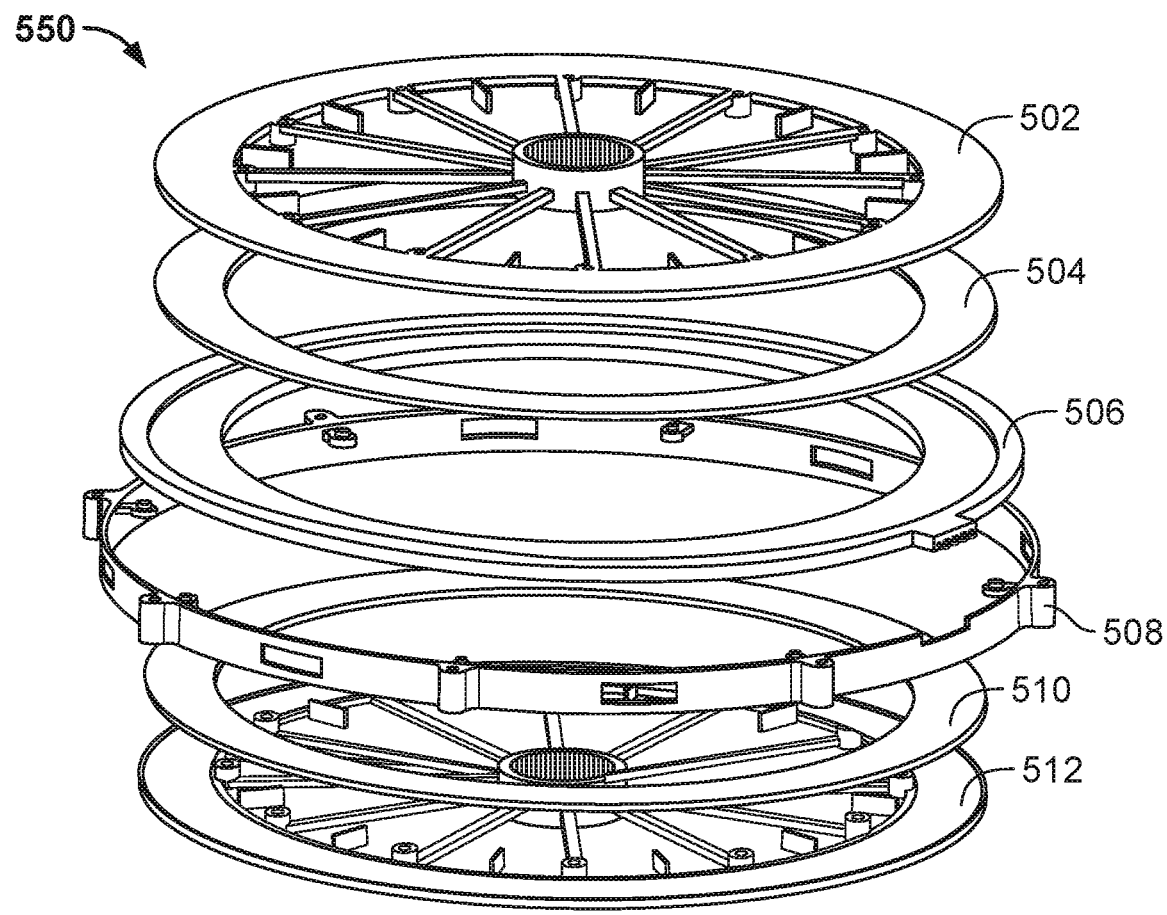
FIG. 5B is an exploded view of an embodiment of a magnetic unit for a modular motor assembly.

FIG. 5B is an exploded view of an embodiment of a magnetic unit for a modular motor assembly. The magnetic unit includes upper rotor housing 502, upper rotor 504, stator 506, stator housing 508, lower rotor 510, and lower rotor housing 512. Each of the components are like their counterparts in FIG. 5A unless otherwise described.

In various embodiments, internal magnetic units differ from end piece magnetic units. An internal magnetic unit includes the components (including two magnet arrays 504, 510) shown in FIG. 5B, while an end piece magnetic unit includes a single magnet array. Referring to FIG. 5B, an end piece magnetic unit, in various embodiments, comprises rotor housing 502, magnet array 504, stator 506, and stator housing 508. A single stack motor may be formed by joining two end magnetic units. Together, the two end magnetic units comprise two magnet arrays with a stator in between.

As mentioned above, an internal magnetic unit has a pair of magnet arrays. Referring to FIG. 5B, an internal magnetic unit comprises upper rotor housing 502, upper rotor 504, stator 506, stator housing 508, lower rotor 510, and lower rotor housing 512. In some embodiments, the rotor housing and stator housing may be different from the housing 502, 508, and 512.

FIG. 6 illustrates an embodiment of a motor controller. In various embodiments, the controller is adapted to convert DC power from a battery to AC at a pre-determined frequency to drive the windings in a motor to which the controller is electrically coupled.

The motor controller includes one or more PCBs and one or more heat sinks (604, 606, 608, and 610). Here, each structure 623, 634, and 636 comprises two PCBs. Each PCB has a respective heat sink bonded to the board. In this example, PCB 602 is mounted on heat sink 604. Each of the PCBs may be adapted to power one of the stacks (sometimes called "magnetic units") in the motor.

As air flows through the heat sink, there is a pressure drop due to friction as the air passes through the narrow channels created by the fins of the heat sink. The heat sink may be dimensioned to provide a pre-defined pressure drop without negatively impacting motor operation. Unlike a conventional heat sink, which is usually designed to provide maximum cooling, a heat sink according to various embodiments of the present disclosure cools the controller adequately (which is not necessarily maximally). The heat sink may be dimensioned and shaped to provide a pressure drop matching a fan curve of the motor. An example of a fan curve is shown in FIG. 4. When air passes through the heat sink, e.g., via pathways 640*a* and 640*b*, cooling is provided as cool air passes over the fins.

FIG. 7 is a block diagram illustrating an example of an aircraft in which a motor capable of cooling a controller is provided. Aircraft 700 is a multicopter that uses a modular motor assembly.

In the example shown, the multicopter 700 has two propulsion systems: a forward propulsion system 702 and a vertical propulsion system (not shown). The forward propulsion system 702 is used to propel the multicopter forward along a longitudinal (roll) axis. As shown here, the blades of the lift fans in the forward propulsion system 702 are oriented to rotate in a vertical plane.

The forward propulsion system 702 produces lift to keep the aircraft airborne in a manner similar to a fixed wing aircraft (e.g., where the forward propulsion of the multicopter causes airflow over and under the wings which in turn induces an aerodynamic force upwards on the bottom of the wings). In the exemplary multicopter, the forward propulsion system is implemented using a configuration of a motor (e.g., a pusher motor), controller, and lift fan allowing for passive cooling (various embodiments of which are described herein).

In the vertical propulsion system, the blades of the lift fans are oriented to rotate in a horizontal plane. The vertical propulsion system is used to move (e.g., up or down) the aircraft along a vertical (yaw) axis. The vertical propulsion system produces lift in a manner similar to helicopters where the lift is produced by the airflow downwards.

In various embodiments, the shapes and/or pitch angles of the blades in the forward propulsion system 702 and vertical population system may be optimized for the specific type of flying (e.g., forward flight versus vertical flight).

While the multicopter is flying, one of the propulsion systems may be turned off (if desired) while the other propulsion system remains on. For example, if the multicopter 700 is flying forward at a constant altitude, then the vertical propulsion system may be turned off to conserve power and/or because the forward propulsion system 702 is more efficient at flying in this manner. Or, if the multicopter is hovering in-air at a constant position, the forward propulsion system 702 may be turned off.

FIG. 8 is a flow chart illustrating an embodiment of a process for manufacturing a motor controller and motor. This process 800 may be implemented to facilitate assembly of the motor controller and motor shown in FIG. 1. In various embodiments, the process may be carried out programmatically, for example by a robotic arm and/or a motor controller.

In the example shown, the process begins by arranging a motor controller and a motor (802). For example, the controller and the motor may be arranged end-to-end in the configuration shown in FIG. 1. This allows air to be drawn in, pass over PCBs arranged in the inside walls of the heat sink, and exit the controller to enter the motor.

The process couples the motor controller to the motor via a duct (804). The controller and motor may be aligned, then connected via a flexible duct. The duct the couples the controller to the motor forms a passageway through which air exiting the controller may enter the motor. Examples of ducts are further described herein, e.g., with respect to FIG. 1. In various embodiments, the flexible duct is attached to the controller by means of bonded-on metal flanges that are held in place with quick-release (e.g., quarter-turn) fasteners. The duct is attached to the motor by means of a bonded-on metal flange held to the motor with threaded fasteners. At the controller end, the metal flanges of the duct are sealed to the controller by means of foam gaskets. At the motor end, the flexible duct has a molded flange that serves as a gasket, sealing it to the motor.

The process proceeds to adapt the arrangement to passively provide cooling via airflow in proportion to cooling needs (806). For example, in operation, if it is determined that cooling is needed, airflow is drawn in in proportion to cooling needs. Cooling may be provided passively without needing additional components as described herein. For example, fan features integrated with the motor cause air to be sucked in from outside the controller, pass through the duct, and exit the motor. Example air flow pathways are described herein, e.g., with respect to FIG. 1.

In various embodiments, whether cooling is needed may be determined by a sensor or processor. For example, a processor in the controller may determine whether the controller and/or the motor is in operation. If so, cooling is determined to be needed because heat is generated when the controller and/or the motor is in operation. As another example, a temperature sensor detect changes to temperature. If a temperature meets a threshold, then it is determined that cooling is needed. In various embodiments, unlike conventional cooling methods that might depend on a load meeting a minimum threshold or a vehicle being in motion, cooling according to embodiments described herein may be provided even when an aircraft is stationary and not flying.

The techniques described herein have many advantages over conventional techniques for cooling a motor controller. In one aspect, the cooling techniques described here also work for the extreme points of torque. For example, a motor and controller may be cooled when an aircraft is stationary but the motor is at high load. The cooling provided is largely independent of aircraft speed since it depends primarily on motor/propeller speed. As another example, a motor and controller may be cooled at low load. The power required to drive cooling flow is minimized when the cooling requirements are minimal. The motor and motor controller system is less complex than conventional systems (e.g., typical systems that incorporate an additional fan or coolant) and results in weight and cost reduction. The cooling provided matches the cooling demand such that when there is an increased need for cooling such as when motor RPMs increase, additional cooling is provided.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system comprising:
   an electric motor including at least one rotor with integrated features positioned and configured to pull air into and through the electric motor;
   at least one motor controller each comprising a heat sink positioned in an air intake path from a source of air to the electric motor; and
   a duct coupling the electric motor to the at least one motor controller, such that the electric motor and the at least one motor controller can move independently from each other while coupled, wherein the electric motor, the at least one motor controller, and the duct are axially aligned along an axis of rotation of the electric motor,
   wherein the heat sink is wedge-shaped with a wider end of the wedge at a distal end of the at least one motor controller and a narrower end at a proximal end of the at least one motor controller.

2. The system of claim 1, wherein the heat sink and motor are structured to provide an equilibrium flow condition in which an equilibrium flow rate provides cooling at least equal to heat generated by the at least one motor controller and the electric motor.

3. The system of claim 1, wherein the source of air includes a low-drag air inlet.

4. The system of claim 1, wherein the electric motor is placed at an aft end of the system.

5. The system of claim 1, wherein the electric motor includes a non-iron core.

6. The system of claim 1, wherein the system is provided as part of a lift fan assembly.

7. The system of claim 1, where the at least one motor controller includes a second heat sink positioned in the air intake path such that air flows around and through each of the heat sink and the second heat sink.

8. The system of claim 1, wherein the heat sink is provided between printed circuit boards of the at least one motor controller.

9. The system of claim 1, wherein the heat sink and motor are structured to operate within a region of thermal performance in which heat rejected is at least equal to heat generated by the at least one motor controller and the electric motor.

10. The system of claim 9, wherein the heat sink and motor are structured to provide an equilibrium flow condition such that the equilibrium flow condition intersects the region of thermal performance.

11. The system of claim 1, wherein air is drawn via a fin structure.

12. The system of claim 11, wherein the fin structure is structured based at least in part on a fan curve.

13. The system of claim 1, wherein the at least one rotor includes at least one internal paddle.

14. The system of claim 13, wherein the at least one internal paddle is adapted to facilitate centrifugal air flow.

15. The system of claim 13, wherein the at least one internal paddle is adapted to facilitate air flow through the at least one motor controller and the electric motor.

16. The system of claim 1, wherein the electric motor includes at least one rotor and at least one stator.

17. The system of claim 16, wherein the at least one rotor and the at least one stator are each annular in shape.

18. The system of claim 17, wherein the at least one rotor and the at least one stator are each annular in shape and provided between spoke structures, the spoke structures being adapted to pull air through.

19. A method comprising:
   arranging at least one motor controller and at least one electric motor, wherein the at least one motor controller each comprises a heat sink positioned in an air intake path from a source of air to the electric motor, wherein the heat sink is wedge-shaped with a wider end of the wedge at a distal end of the at least one motor controller and a narrower end at a proximal end of the at least one motor controller;
   coupling the at least one motor controller and at least one electric motor via a duct such that the electric motor and the at least one motor controller can move independently from each other while coupled and the electric motor, the at least one motor controller, and the duct axially aligned along an axis of rotation of the electric motor; and
   adapting the arrangement of the at least one motor controller and the at least one electric motor to passively provide cooling via airflow through the at least one motor controller and at least one electric motor in proportion to a load on the at least one electric motor.

20. A forward propulsion system comprising:
   a propeller;
   an electric motor coupled to drive the propeller and including at least one rotor with integrated features positioned and configured to pull air into and through the electric motor in proportion to a load of the electric motor;
   at least one motor controller each comprising a heat sink positioned in an air intake path from a source of air to the electric motor; and
   a duct coupling the electric motor to the at least one motor controller such that the electric motor and the at least one motor controller can move independently from each other while coupled, wherein the electric motor, the at least one motor controller, and the duct axially aligned along an axis of rotation of the electric motor,
   wherein the heat sink is wedge-shaped with a wider end of the wedge at a distal end of the at least one motor controller and a narrower end at a proximal end of the at least one motor controller.

* * * * *